United States Patent Office

3,127,413
Patented Mar. 31, 1964

3,127,413
OCTAHYDROISOINDOLES
Allan Poe Gray, Decatur, Ill., assignor to Neisler Laboratories, Inc., Decatur, Ill., a corporation of Delaware
No Drawing. Filed Nov. 22, 1960, Ser. No. 75,900
17 Claims. (Cl. 260—319)

This invention relates to compositions of matter classified in the art of chemistry as aralkyl-dioxyoctahydroisoindoles and to processes for making such compositions.

The invention sought to be patented, in its composition aspect, resides in the concept of a chemical compound identified as an aralkyl-dioxyoctahydroisoindole having a molecular structure in which there are attached to an octahydroisoindole ring system an aralkyl moiety in the 2-position, a hydroxy or acyloxy radical in the 5-position, and a lower-alkoxy radical in the 6-position; wherein aralkyl represents a monocyclic or bicyclic aromatic ring system linked to an alkylene chain which contains at least one carbon atom and not more than three carbon atoms.

The tangible embodiments of this invention, in their free base form, are high boiling liquids or low melting solids all of which possess the inherent applied use characteristics of depressing the central nervous system and of relieving hypertensive conditions as shown by standard pharmacological evaluation in animal organisms. The central nervous system depressant properties indicate the compounds to be useful as tranquilizing agents and for potentiating the action of barbiturates.

The free base compounds of the present invention have the generalized structure

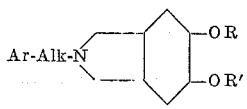

Formula I wherein Ar represents a radical from an aromatic ring system which is monocyclic or bicyclic, Alk represents an alkylene chain, straight or branched, containing at least one and not more than three carbon atoms, R represents hydrogen or acyl and R' represents lower-alkyl.

In said generalized structure, or elsewhere within the description of the invention, the terms "alkyl" or "Alk" as they appear in the term Ar-Alk or aralkyl refer to a straight or branched alkylene chain containing at least one and not more than three carbon atoms. The term "lower-alkyl" refers to alkyl radicals having one to six carbon atoms, inclusive, either straight chain as illustrated by methyl, ethyl, n-butyl and n-hexyl, or branched chain, as illustrated by isopropyl, s-amyl and t-butyl. Said lower-alkyl radical may contain one double bond, for example, allyl, and when it does is to be regarded as the full equivalent of the lower-alkyls that are fully saturated.

The term "Ar," as herein used, refers to a radical derived from a monocyclic or bicyclic ring system which is characterized by having five to ten essentially coplanar ring atoms, one of which can be a heteroatom such as nitrogen, oxygen or sulfur; the nucleus of said ring system possessing 2+4n pi electrons. The presence of 2+4n pi electrons in a coplanar ring system is a fundamental quantum mechanical criterion of aromaticity as taught in the modern textbooks of organic chemistry. See, for example, the treatment by G. A. Wheland in his book Resonance in Organic Chemistry, John Wiley and Sons, New York (1955), especially at pages 144 through 147. The present invention is concerned with ring systems wherein n represents the integer 1 or 2, that is, with ring systems having 6 or 10 pi electrons, 6 or 10 pi electrons being required for aromaticity in a monocyclic or bicyclic ring system containing 5 to 10 coplanar ring atoms, one of which can be a heteroatom such as nitrogen, oxygen, or sulfur. For example, phenyl, thienyl, pyrrolyl and furyl have six pi electrons and napthyl, benzothienyl, benzopyrrolyl and benzofuryl have ten pi electrons participating in resonance interaction in the ring system.

The above definition of Ar may be summarized by describing Ar as an aromatic radical containing five to ten ring atoms, one of which can be a heteroatom. Implicit in this definition are all of the attributes hereinabove described, i.e., the coplanar monocyclic or bicyclic ring system containing 2+4n pi electrons, wherein n represents 1 or 2. The heteroatom must be selected so as to maintain the above attributes and to preserve the aromatic characteristics of the ring system. Methods of selecting suitable heteroatoms are known to those skilled in the art of organic chemistry.

The aromatic moiety includes, as the full equivalent thereof, the unsubstituted aromatic radical and such radical bearing on the ring in place of a hydrogen atom or atoms, one or more simple substituents not adversely affecting the pharmacological properties of the above generalized structure such as halo, lower-alkyl, lower-alkoxy, methylene-dioxy, amino, nitro, trihalomethyl, hydroxy, mercapto and lower-alkylthio and other groups commonly used in the art as aromatic ring substituents.

The octahydroisoindole ring system may have lower-alkyl substituents as well as the dioxy substituents hereinbefore described. Such lower-alkyl derivatives are to be considered full equivalents of the non-substituted dioxyoctahydroisoindoles of this invention.

The acyloxy radical in the 5-position of the octahydroisoindole nucleus is the residue of an organic monobasic carboxylic acid. The precise structure of the acyloxy radical is not critical provided it possesses the characteristic of contributing lipophilic bulk to the molecule. Thus, lower-aliphatic, cyclo-lower-aliphatic, monocyclicaryl, and monocyclicaraliphatic acids are suitable sources of the acyloxy residue. We have held constant the 2- and 6-position substituents on the said isoindole nucleus while varying the 5-acyloxy substituent and determined such wide variants as propionoxy and trimethoxybenzoxy to be about equally effective in contributing to the desired pharmacological properties of the physical embodiments of the invention.

The aliphatic and cycloaliphatic acids can be saturated or unsaturated and the degree of unsaturation can be olefinic or acetylenic in character. The basic structural chain or ring can be interrupted by: an atom of nitrogen, as in the carbamic acid series or in the substituted-amino acid series; an atom of oxygen, as in the alkoxy-acetic acid series; an atom of sulfur, as in the thio-acids or in the mercapto-acids; and, can bear one or more simple substituents, e.g., lower-alkoxy, lower-alkylthio, lower-alkyl, halo, trifluoromethyl, and hydroxy. All of such variations are the full equivalents of the subject matter sought to be patented and possess the same inherent applied use characteristics as said subject matter.

For purposes of illustration, but without limitation, the acids included within the scope of the invention are: lower-aliphatic acids, such as acetic, 2-methylbutyric, n-caproic, crotonic, 2-pentynoic, and 2,4-hexadienoic; monocyclic lower-aliphatic acids, such as p-nitrophenoxyacetic, o-tolylacetic, 3,4,5-trimethoxycinnamic, γ-phenylpropynoic, benzylthioacetic, γ-(2-pyridyl)-propionic, phenylalaninic, ω-phenylcaproic; monocyclic acids, such as nicotinic, cyclohexanecarboxylic, benzoic, 3,4-methylenedioxybenzoic, 3-dimethylaminobenzoic, 3-trifluoromethylbenzoic, 5-nitrofuranecarboxylic, 3,4,5-triacetylshikimic, O-carbethoxysyringic, O-acetylvanillic.

The invention sought to be patented, in its process aspect, resides in the concept of embodying such a molecular structure in a tangible form by: (A) epoxidation of a Δ⁴-tetrahydrophthalic anhydride by means of a per acid, acid catalyzed alcoholysis of the epoxy compound with a lower alkanol to yield an ester γ-lactone of Formula II

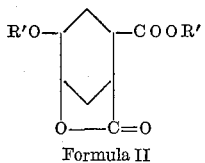

Formula II treating said lactone with an aralkylamine to form an imide of Formula III

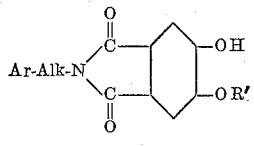

Formula III and subsequent reduction of the imide to form a 2-aralkyl-5,6-dioxy-octahydroisoindole of Formula I, in which R represents H; and (B) heating a Δ⁴-tetrahydrophthalic anhydride with an aralkylamine to yield an imide of the formula

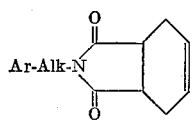

epoxidation of the imide by means of a per acid, acid catalyzed alcoholysis of the epoxy compound with a lower-alkanol to yield a compound of Formula III and subsequent reduction to form a 2-aralkyl-5,6-dioxy-octahydroisoindole of Formula I, in which R represents H. The final compounds of sequences (A) and (B) may be acylated with a suitable acylating agent to yield compounds of Formula I in which R represents acyl. In both of these sequences R, R', Ar and Alk have the same meaning as shown for Formula I.

Among the intermediates useful in preparing compounds of Formula I, and forming a part of this invention, are compounds of Formula II and Formula III.

For convenience in denoting the stereochemistry of these compounds, the terminology developed in the steroid field has been adopted and may be illustrated as follows:

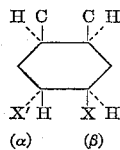

the two carbon atoms attached to the cyclohexane ring in the illustration are pictured as above the plane of the cyclohexane ring. Substituents, such as X, which are above the plane of the ring, on the same side as the two carbon atoms, are designated as β-substituents. Substituents, such as X', which are below the plane of the ring, are designed as α-substituents.

The process forming a part of this invention is further illustrated with respect to the formation of compounds of Formula I, by the following reaction Schemes, A and B, wherein R, R', Ar, and Alk have the meanings given in Formula I above. The present evidence indicates that these process reactions are stereospecific:

SCHEME A

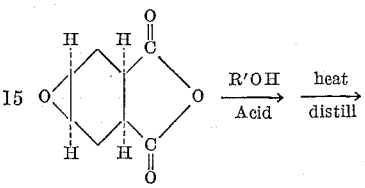

IV

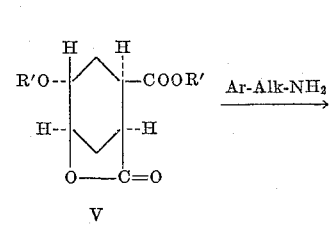

V

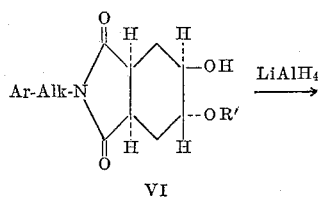

VI

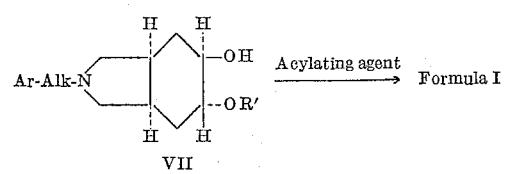

VII

In reaction Scheme A, the epoxidation of a Δ⁴-cis-tetrahydrophthalic anhydride gives the β-epoxy derivative, Formula IV; acid catalyzed alcoholysis of the β-epoxy derivative and distillation of the product produces the ester γ-lactone, Formula V, which, on reaction with a primary amine, Ar—Alk—NH₂, gives a 4β-hydroxy-5α-loweralkoxy-cis-imide, Formula VI; said imide is reduced with lithium aluminum hydride to obtain the corresponding 5,6-dioxyoctahydroisoindole stereoisomer, Formula VII. Formula VII and Formula I are equivalent when R in Formula I is hydrogen. The compound of Formula VII may be converted to other products of Formula I, in a manner known to those skilled in the art. For example, the compound of Formula VII can be treated with an acylating agent such as an acid chloride, acid anhydride, N-alkyl isocyanate, and the like, to give the product of Formula I in which R is acyl.

SCHEME B

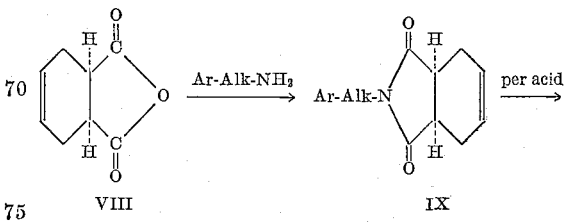

VIII           IX

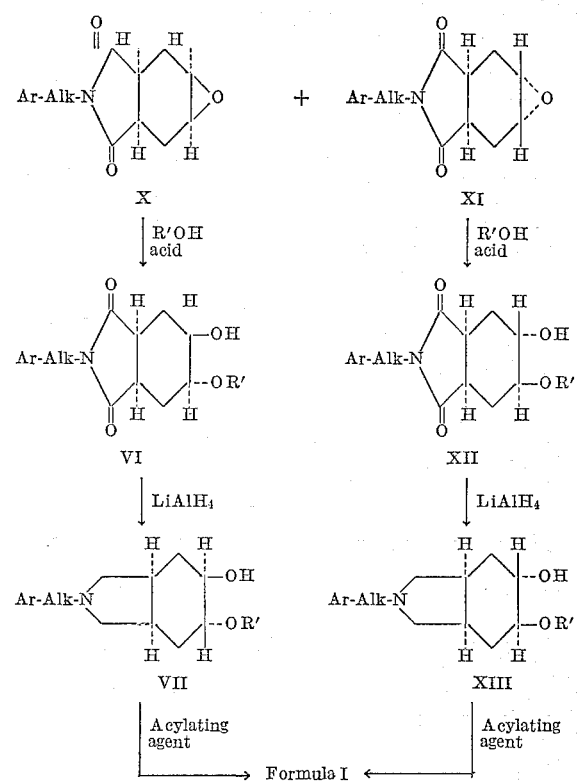

In reaction Scheme B, the reaction between a primary amine, Ar—Alk—NH$_2$, wherein Ar—Alk is as previously defined, and a Δ$^4$-cis-tetrahydrophthalic anhydride, Formula VIII, gives the cis-imide, Formula IX; epoxidation of the imide gives a mixture of the β-epoxy derivative, Formula X, and the α-epoxy derivative, Formula XI, which may be separated by crystallization from the appropriate solvent; acid catalyzed alcoholysis of the β-epoxy derivative yields the 4β-hydroxy-5α-lower-alkoxy-cis-imide, Formula VI, which, upon reduction with lithium aluminum hydride, gives the corresponding 5,6-dioxyoctahydroisoindole stereoisomer, Formula VII. In a like manner the α-epoxy derivative, Formula XI, gives the 4α-hydroxy-5β-lower-alkoxy-cis-imide, Formula XII, and upon reduction the corresponding 5,6-dioxyoctahydroisoindole stereoisomer, Formula XIII, is obtained. Formula VII and Formula XIII are equivalent to Formula I when R in Formula I is hydrogen. The products of Formula VII and Formula XIII may be converted to other products of Formula I as described under Scheme A.

Other agents are known to those skilled in the art of chemistry for reducing imides and from the foregoing illustration of the manner of using lithium aluminum hydride, it will be apparent such other agents can be employed to reduce the imides of Formula VI, or XII, to the corresponding 5,6-dioxy-octahydroisoindole stereoisomer, Formula VII or XIII, as the full equivalent of the lithium aluminum hydride hereinbefore described. Reducing agents intended to be included are, for purposes of illustration, but without limitation: a combination of aluminum hydride and aluminum chloride; a combination of sodium borohydride and aluminum chlorodialkoxide; sodium and butanol; and electrolytic reduction.

Alternatively, the compounds of Formula I can be prepared by reacting a primary amine, Ar—Alk—NH$_2$, wherein Ar—Alk is as previously defined, with the bis-p-toluenesulfonate ester of 4-cyclohexene-1,2-dimethanol to give a hexahydroisoindole; epoxidation of the hexahydroisoindole yields the corresponding 5,6-epoxyoctahydroisoindole; acid catalyzed alcoholysis produces a 5,6-dioxyoctahydroisoindole derivative which can be converted to other compounds of Formula I, in a manner known to those skilled in the art.

The free bases of Formula I are generally obtained in the form of oils. Sometimes the oil can be crystallized to yield the free base as a crystalline solid. Often the free base oil does not crystallize, and to obtain a crystalline form, the free base is converted to its acid-addition salt or quaternary salt as described below. These salts are to be regarded as the full equivalents of the free bases, since they represent merely convenient forms in which to administer the compounds for the pharmacological purposes herein set forth.

The acid-addition salts of the invention can be prepared in conventional manner by reacting a 2-aralkyl-5,6-dioxyoctahydroisoindole derivative of the invention with the usual inorganic acids as, for example, hydrochloric, hydrobromic, hydriodic, sulfuric, and phosphoric; or an organic acid, as, for example, acetic, citric, tannic, et cetera.

The quaternary ammonium salts of the invention can also be prepared in the manner known for preparing such salts by reacting a 2-aralkyl-5,6-dioxyoctahydroisoindole with a lower-alkyl ester, for example, lower-alkyl halides as methyl bromide, ethyl chloride, propyl iodide, et cetera, or aralkyl halides, as benzyl chloride.

The anions of the salts can be exchanged for different anions, where desired, by conventional techniques.

The following preparations and examples are illustrative of the process and products of the present invention, but are not to be construed as limiting. Preparations I and II illustrate the preparation of intermediates useful in preparing compounds of Formula I. All temperatures are reported in degrees centigrade.

PREPARATIONS

*Preparation I*

2-CARBOMETHOXY-4-METHOXY-5-HYDROXYCYCLO-HEXANECARBOXYLIC ACID γ-LACTONE

To a mixture of 48.0 grams (0.28 mole) of 4,5β-epoxy-cis-hexahydrophthalic anhydride and 300 ml. of absolute methanol was added 5 drops of concentrated sulfuric acid. The mixture was boiled under reflux on a steam-bath for 5 hours, by which time all of the anhydride had dissolved. The solution was boiled for an additional hour, allowed to stand overnight and concentrated in vacuo to about one-half its volume. The concentrated solution was stirred with sufficient calcium carbonate to neutralize the acid, filtered and lyophilized. Distillation of the thick oil residue yielded 33.3 grams or 54 percent theoretical of a colorless oil, boiling 150–152 degrees at 0.3 of a millimeter pressure, $n_D^{28}$=1.4778. The present evidence indicates that this product is 2β-carbomethoxy-4α-methoxy-5β-hydroxycyclohexanecarboxylic acid γ-lactone.

*Analysis.*—Calculated: C, 56.07; H, 6.59. Found: C, 56.29; H, 6.65.

*Preparation II*

2-CARBETHOXY-4-ETHOXY-5-HYDROXYCYCLO-HEXANECARBOXYLIC ACID γ-LACTONE

In a manner similar to that of Preparation I, 4,5β-epoxyhexahydrophthalic anhydride was reacted with boiling ethanol to give a 42 percent yield of a colorless oil, boiling between 121–142 degrees at 0.5 millimeter pressure, $n_D^{25}$=1.4650. The present evidence indicates that this product is 2β-carbethoxy-4α-ethoxy-5β-hydroxycyclohexanecarboxylic acid γ-lactone.

*Analysis.*—Calculated: C, 59.50; H, 7.49; Saponification equivalent 121.1. Found: C, 59.05; H, 7.61; Saponification equivalent 119.5.

The following Examples 1 to 18 illustrate the preparation of compounds of Formula I.

EXAMPLES

*Example 1*

A. N-(3-INDOLYLETHYL)-4-HYDROXY-5-METHOXY-1,2-CYCLOHEXANEDICARBOXIMIDE

An intimate mixture of 50.0 grams (0.31 mole) of tryptamine and 75.0 grams (0.35 mole) of the product described in Preparation I was heated under a slow stream of nitrogen in an oil-bath at a temperature of 145 degrees for 6 hours. The dark melt bubbled gently during the heating period. The glass, which formed on cooling the melt to room temperature, was dissolved in chloroform. The chloroform solution was washed with 5 percent hydrochloric acid, then extracted with 5 percent sodium hydroxide solution and finally washed with water. The chloroform solution was dried over sodium sulfate and diluted with petroleum ether (B.P. 60–70 degrees) to yield 66.5 grams of tan crystals, softening gradually above 110 degrees and melting at 125–129 degrees. Recrystallization from chloroform-petroleum ether (B.P. 60–70 degrees) afforded colorless crystals, melting at 128–130 degrees. The present evidence indicates that this product is N-(3-indolylethyl)-4β-hydroxy - 5α - methoxy-cis-1,2-cyclohexanedicarboximide.

*Analysis.*—Calculated: C, 66.65; H, 6.48. Found: C, 66.62; H, 6.67.

B. 2-(3-INDOLYLETHYL)-5-HYDROXY-6-METHOXY-OCTAHYDROISOINDOLE

To a slurry of 20.9 grams (0.55 mole) of lithium aluminum hydride in a mixture of 750 milliliters of anhydrous ether and 750 milliliters of dry ethylene glycol dimethyl ether was added, dropwise with stirring, a solution of 52.0 grams (0.15 mole) of the product described in Example 1A in 500 milliliters of warm ethylene glycol dimethyl ether. Stirring was continued and the reaction mixture was heated on a steam-bath under reflux for 10 hours. Excess lithium aluminum hydride was decomposed by the dropwise addition of ethyl acetate to the ice-cold reaction mixture. Water was added and then 1700 milliliters of 5 percent hydrochloric acid. The aqueous acid layer was separated, washed with ether, treated with 280 grams of Rochelle salt, made strongly alkaline and extracted with ether. Drying and removal of the ether left a thick oil which partially crystallized from aqueous isopropyl alcohol. The mixture of crystals and oil was treated with charcoal in a 2 percent hydrochloric acid solution. The acid solution was neutralized with concentrated ammonia to precipitate an oil which crystallized on standing. Recrystallization from aqueous isopropyl alcohol afforded 28.3 grams or a 60 percent theoretical yield of crystals, melting between 89–95 degrees. After another recrystallization from aqueous ethanol, the product melted at 94–96 degrees. The present evidence indicates that this product is 2-(3-indolylethyl)-5β-hydroxy-6α-methoxy-cis-octahydroisoindole.

*Analysis.*—Calculated: N (basic), 4.46. Found: N (basic), 4.17.

2-(3-indolylethyl) - 5β - hydroxy-6α-methoxy-cis-octahydroisoindole hydrochloride was prepared by treating an ether solution of the base with excess ethereal hydrogen chloride. After decolorization with charcoal and recrystallization from ethanol-ether, the hydrochloride salt shrank at 70 degrees and melted with gas evolution at 98–99 degrees.

*Analysis.*—Calculated: C, 65.03; H, 7.76. Found: C, 64.78; H, 7.98.

Example 2

2-(3-INDOLYLETHYL)-5-(3,4,5-TRIMETHOXYBENZOXY)-6-METHOXYOCTAHYDROISOINDOLE

To a solution, cooled in an ice-bath, of 15.0 grams (0.048 mole) of the base prepared in Example 1B in 250 milliliters of dry pyridine was added, portionwise with stirring, 34.6 grams (0.15 mole) of 3,4,5-trimethoxybenzoyl chloride. The solution was allowed to warm to room temperature and then stored in the dark for 5 days at room temperature. The solution was poured on a slurry of cracked ice and 10 percent hydrochloric acid. The precipitated 3,4,5-trimethoxybenzoic anhydride was filtered from the acid solution and the filtrate was washed with ether, cooled in ice, made alkaline with solid potassium carbonate and extracted with ether. The ether extract was dried over sodium sulfate and concentrated to a red resin. This was dissolved in ethyl acetate and shaken with a 3 percent hydrochloric acid solution to precipitate the crude hydrochloride salt of the product as a red oil, not soluble in either layer. The aqueous and ethyl acetate layers were decanted, the red oil was washed with fresh solvent, treated with charcoal in acetone and twice recrystallized from acetone-ether to give 11.2 grams, or a 43 percent yield of slightly pink crystals, shrinking at 135 degrees, evolving some gas at 160 degrees and melting at 196–197 degrees. Further recrystallization from isopropyl alcohol-ether and again from acetone-ether provided colorless crystals, melting at 198–199.5 degrees with gas evolution. The present evidence indicates that this product is 2-(3-indolylethyl)-5β-(3,4,5-trimethoxybenzoxy) - 6α - methoxy-cis-octahydroisoindole hydrochloride.

*Analysis.*—Calculated: C, 63.90; H, 6.84; Cl, 6.51. Found: C, 64.18; H, 6.79; Cl, 6.31.

Example 3

2-(3-INDOLYLETHYL)-5-PROPIONOXY-6-METHOXY-OCTAHYDROISOINDOLE

To an ice-cold solution of 5.0 grams (0.016 mole) of the base prepared in Example 1B in 60 milliliters of dry pyridine was added, dropwise, 3.7 grams (0.04 mole) of propionyl chloride. A yellow precipitate began to form as the solution approached room temperature. The reaction mixture was stored in the dark for 3 days and then poured on a slurry of cracked ice and 10 percent hydrochloric acid. The aqueous acid mixture was washed with ether, made alkaline with solid potassium carbonate and extracted with ether. Drying and removal of the ether left a thick oil which resisted attempts at crystallization. It was dissolved in chloroform and the hydrochloride salt precipitated with ethereal hydrogen chloride. The salt was decolorized with charcoal in isopropyl alcohol and crystallized from isopropyl alcohol-ether to give 1.2 grams of material, melting with gas-evolution at 130 degrees and above. Recrystallization from isopropyl alcohol-acetone provided colorless crystals, melting at 158–163 degrees with gas evolution. The present evidence indicates that this product is 2-(3-indolyethyl)-5β-propionoxy-6α-methoxy-cis-octahydroisoindole hydrochloride.

*Analysis.*—Calculated: C, 64.93; H, 7.68; Cl, 8.71. Found: C, 65.10; H, 7.69; Cl, 8.55.

Example 4

2-(3-INDOLYLETHYL)-5-PHENYLACETOXY-6-METHOXYOCTAHYDROISOINDOLE

In a manner similar to that described in Example 3, treatment of the base prepared in Example 1B with phenylacetyl chloride afforded crystals, melting at 76 degrees and above with gas evolution after recrystallization from acetone-ether. The present evidence indicates that this product is 2-(3-indolylethyl)-5β-phenylacetoxy-6α-methoxy-cis-octahydroisoindole hydrochloride.

*Analysis.*—Calculated: C, 69.14; H, 7.09; Cl, 7.56. Found: C, 69.24; H, 6.80; Cl, 7.12.

Example 5

A. N-(3-INDOLYLETHYL)-4-HYDROXY-5-ETHOXY-1,2-CYCLOHEXANEDICARBOXIMIDE

In a manner similar to that described in Example 1A, tryptamine was reacted with the product of Preparation II to give a thick oil which resisted attempts at crystallization. The present evidence indicates that this product is N-(3-indolylethyl) - 4β - hydroxy-5α-ethoxy-cis-1,2-cyclohexanedicarboximide.

B. 2-(3-INDOLYLETHYL)-5-HYDROXY-6-ETHOXY-OCTAHYDROISOINDOLE

In a manner similar to that described in Example 1B, the product of Example 5A was reduced with lithium aluminum hydride to provide a thick oil which did not crystallize. This was dissolved in ether and treated with excess ethereal hydrogen chloride to precipitate the salt which came out of isopropyl alcohol-ether as a hygroscopic white solid, melting at 116–117 degrees. The present evidence indicates that this product is 2-(3-indolylethyl) - 5β - hydroxy - 6α - ethoxy-cis-octahydroisoindole hydrochloride.

*Analysis.*—Calculated: C, 65.83; H, 8.01; Cl, 9.71. Found: C, 66.13; H, 7.72; Cl, 9.60.

Example 6

2-(3-INDOLYLETHYL)-5-CYCLOHEXANECARBOXY-6-ETHOXYOCTAHYDROISOINDOLE

In a manner similar to that described in Example 3, the base prepared in Example 5B was reacted with cyclohexanecarbonyl chloride to provide material which formed tan crystals from acetone ether, melting at 176–178 degrees. The present evidence indicates that this product is 2-(3-indolylethyl)-5β-cyclohexanecarboxy-6α-ethoxy-cis-octahydroisoindole hydrochloride.

*Analysis.*—Calculated: C, 68.25; H, 8.27; Cl, 7.46. Found: C, 68.60; H, 8.11; Cl, 7.57.

Example 7

A. N-PHENETHYL-4-HYDROXY-5-METHOXY-1,2-CYCLOHEXANEDICARBOXIMIDE

A mixture of 32.0 grams (0.15 mole) of the product of Preparation I and 17.0 grams (0.14 mole) of phenethylamine was heated for 6 hours in an oil-bath, the temperature of which was gradually raised from 125 to 150–155 degrees. The melt, which solidified to a glass on cooling, was dissolved in chloroform and the chloroform solution was washed with 10 percent hydrochloric acid, 5 percent sodium hydroxide and finally with water. Drying and removal of the solvent left 42.0 grams of a pale yellow oil which did not crystallize. The present evidence indicates that this product is N-phenethyl-4β-hydroxy-5α-methoxy-cis-1,2-cyclohexanedicarboximide.

B. 2-PHENETHYL-5-HYDROXY-6-METHOXYOCTAHYDROISOINDOLE

To a slurry of 19.0 grams (0.5 mole) of lithium aluminum hydride in 500 milliliters of anhydrous ether was added, dropwise with stirring, a solution of 42.0 grams (0.14 mole) of the crude product obtained in Example 7A in 100 milliliters of dry ethylene glycol dimethyl ether. Stirring was continued and the reaction mixture was heated under reflux on a steam-bath for 11 hours. Ethyl acetate was added to the ice-cold mixture, followed by 100 milliliters of water to hydrolyze the aluminum complexes. The precipitate of aluminum hydroxides was filtered off and washed with ether. The combined filtrate and ether washings were extracted with 10 percent hydrochloric acid, and the cold acid solution was made strongly alkaline and extracted with ether. The ether layer was dried, concentrated, and the residual oil was distilled to give 16.0 grams or a 42 percent yield of a product boiling 164–168 degrees at 0.5 millimeter pressure, $n_D^{25}$=1.5397. The present evidence indicates that this product is 2-phenethyl-5β-hydroxy-6α-methoxy-dis-octahydroisoindole.

*Analysis.*—Calculated: N (basic), 5.09. Found: N (basic), 5.03.

2-phenethyl-5β-hydroxy-6α-methoxy-cis-octahydroisoindole hydrochloride was prepared by treating an ether solution of the base with excess ethereal hydrogen chloride, and was recrystallized from isopropyl alcohol-ethyl acetate to give colorless pellets, melting at 158–160 degrees.

*Analysis.*—Calculated: C, 65.48; H, 8.40; Cl, 11.37. Found: C, 65.62; H, 8.01; Cl, 11.38.

2-phenethyl-5β-hydroxy-6α-methoxy-cis-octahydroisoindole picrate, recrystallized from ethanol, melted at 168–169 degrees.

2-phenethyl-5β-hydroxy-6α-methoxy-cis-octahydroisoindole methiodide, prepared by treating an ether solution of the base with excess methyl iodide, and, recrystallized from isopropyl alcohol ethyl acetate, melted at 136–137 degrees.

*Analysis.*—Calculated: C, 51.81; H, 6.76; I, 30.41. Found: C, 52.23; H, 6.80; I, 30.19.

Example 8

2-PHENETHYL-5-(3,4,5-TRIMETHOXYBENZOYL)-6-METHOXYOCTAHYDROISOINDOLE

To an ice-cold solution of 11.0 grams (0.04 mole) of the base prepared in Example 7B in 250 milliliters of dry pyridine was added, portionwise with stirring, 28.0 grams (0.12 mole) of 3,4,5-trimethoxybenzoyl chloride. After it had stood for 3 days, the dark red solution was poured on cracked ice and acidified with 10 percent hydrochloric acid. The precipitate of trimethoxybenzoic anhydride was filtered from the acid solution, and the filtrate was washed with ether, cooled in an ice-bath, made alkaline with solid potassium carbonate and extracted with ether. The ether extract was dried and concentrated to give an oil which did not crystallize. An ether solution of the oil was treated with ethereal hydrogen chloride to precipitate the salt which, after decolorization with charcoal and recrystallization from acetone-ether, formed colorless crystals, melting at 157–158 degrees. The yield was 9.5 grams or 48 percent of the theoretical. The present evidence indicates that this product is 2-phenethyl-5β-(3,4,5-trimethoxybenzoxy)-6α-methoxy-cis-octahydroisoindole hydrochloride.

*Analysis.*—Calculated: C, 64.07; H, 7.17; Cl, 7.01. Found: C, 64.16; H, 7.50; Cl, 7.21.

Treatment of an acetonitrile solution of the base with methyl bromide provided 2-phenethyl-5β-(3,4,5-trimethoxybenzoxy) - 6α-methoxy-cis-octahydroisoindole methobromide as a hygroscopic solid, melting at 92–93 degrees.

*Analysis.*—Calculated: C, 59.57; H, 6.78; Br, 14.16. Found: C, 59.27; H, 6.70; Br, 14.58.

Example 9

2-PHENETHYL-5-(N-ETHYLCARBAMYLOXY)-6-METHOXYOCTAHYDROISOINDOLE

A mixture of 7.0 grams (0.025 mole) of the base prepared in Example 7B and 3 milliliters of ethyl isocyanate was heated on a steam-bath for 45 minutes. The reaction mixture was taken up in benzene and the solution was evaporated under reduced pressure to a thick oil. Crystallization of this from petroleum ether (B.P. 60–70 degrees) afforded 6.9 grams or an 80 percent yield of a product, melting at 64–67 degrees. The present evidence indicates that the product is 2-phenethyl-5β-(N-ethylcarbamyloxy)-6α-methoxy-cis-octahydroisoindole.

*Analysis.*—Calculated: N (basic), 4.05. Found: N (basic), 3.92.

Treatment of an ether solution of the base with ethereal hydrogen chloride gave 2-phenethyl-5β-(N-ethylcarbamyloxy) - 6α-methoxy-cis-octahydroisoindole hydrochloride as a hygroscopic solid from ethanol-ether, melting at 64–67 degrees.

*Analysis.*—Calculated: C, 62.73; H, 8.16; Cl, 9.26. Found: C, 63.17; H, 8.69; Cl, 9.16.

Example 10

A. N-PHENETHYL-4-CYCLOHEXENE-1,2-DICARBOXIMIDE

A mixture of 50.0 grams (0.33 mole) of cis-Δ⁴-tetrahydrophthalic anhydride and 40.0 grams (0.33 mole) of phenethylamine was heated in an oil-bath at a bath temperature of 175 degrees for 4 hours, toward the end of which period the temperature was gradually raised to 200 degrees. The cooled melt, crystallized from ethanol, afforded 72.9 grams or an 87 percent yield of colorless needles, melting at 90–92 degrees. The present evidence indicates that this is the product N-phenethyl-4-cyclohexene-cis-1,2-dicarboximide.

*Analysis.*—Calculated: C, 75.28; H, 6.71. Found: C, 75.28; H, 6.81.

B. EPOXIDATION OF N-PHENETHYL-4-CYCLOHEXENE-1,2-DICARBOXIMIDE

Into 970 milliliters of an ice-cold chloroform solution calculated to contain 0.28 mole of perbenzoic acid, was slowly poured a solution of 70.0 grams (0.27 mole) of the product of Example 10A in 130 milliliters of chloroform. The solution was stored in the refrigerator for 48 hours, at the end of which time oxidation was complete as indicated by titration of an aliquot. The chloroform solution was washed with aqueous sodium carbonate and then with water. Drying and removal of the chloroform left a crystalline residue which was recrystallized from benzene to give 35.0 grams or a 48 percent yield of colorless needles, melting at 157–158 degrees. The present evidence indicates that this product is N-phenethyl-4,5β-epoxy-cis-1,2-cyclohexanedicarboximide.

Evaporation of the combined mother liquors to dryness afforded 20.0 grams or a 27 percent yield of a thick yellow oil which resisted crystallization. The present evidence indicates that this product is N-phenethyl-4,5α-epoxy-cis-1,2-cyclohexanedicarboximide.

C. N-PHENETHYL-4-HYDROXY-5-METHOXY-1,2-CYCLOHEXANEDICARBOXIMIDE

A mixture of 35.0 grams (0.13 mole) of the solid, presumably the β-epoxide product of Example 10B, and 300 milliliters of methanol containing 7 drops of concentrated sulfuric acid was heated under reflux on a steam-bath for 4 hours and then allowed to stand overnight. The solution was treated with calcium carbonate, filtered and evaporated to yield 33.0 grams of a thick yellow oil which could not be crystallized. The present evidence indicates that this product is N-phenethyl-4β-hydroxy-5α-methoxy-cis-1,2-cyclohexanedicarboximide.

D. 2-PHENETHYL-5-HYDROXY-6-METHOXY-OCTAHYDROISOINDOLE

Essentially as described in Example 7B the crude product obtained in Example 10C was reduced with lithium aluminum hydride to give 21.6 grams or a 72 percent yield of an oil, boiling at 158–168 degrees at 0.2 millimeter pressure, $n_D^{25}=1.5397$, which proved to be identical with the product of Example 7B. The present evidence indicates that this product is 2-phenethyl-5β-hydroxy-6α-methoxy-cis-octahydroisoindole.

The hydrochloride salt melted at 159–160 degrees, alone or mixed with the 2-phenethyl-5β-hydroxy-6α-methoxy-cis-octahydroisoindole hydrochloride obtained in Example 7B.

Mixture melting points of the picrate salt melting at 167–168 degrees and the methiodide salt, melting at 135–136 degrees, with the corresponding salts obtained in Example 7B were not depressed.

Example 11

A. N-PHENETHYL-4-HYDROXY-5-METHOXY-1,2-CYCLOHEXANEDICARBOXIMIDE

Methanolysis of the oil, presumably the α-epoxide product of Example 10B, essentially as described in Example 10C, afforded a yellow oil which failed to crystallize. The present evidence indicates that this product is N-phenethyl-4α-hydroxy-5β-methoxy-cis-1,2-cyclohexanedicarboximide.

B. 2-PHENETHYL-5-HYDROXY-6-METHOXY-OCTAHYDROISOINDOLE

The crude product obtained in Example 11A was reduced with lithium aluminum hydride essentially as described in Example 7B to provide a 56 percent yield of a product, boiling at 165–170 degrees at 0.3 millimeter pressure $n_D=1.5400$. The present evidence indicates that this product is 2-phenethyl-5α-hydroxy-6β-methoxy-cis-octahydroisoindole.

*Analysis.*—Calculated: N (basic), 5.09. Found: N (basic), 5.03.

2-phenethyl-5α-hydroxy-6β-methoxy-cis-octahydroisoindole hydrochloride, prepared by treatment of an ether solution of the base with excess ethereal hydrogen chloride and recrystallized from isopropyl alcohol-ethyl acetate, melted at 165–166 degrees. The melting point of a mixture with the hydrochloride salt obtained in Example 7B was markedly depressed to 131–143 degrees.

*Analysis.*—Calculated: C, 65.48; H, 8.40; Cl, 11.37. Found: C, 65.73; H, 8.31; Cl 11.41.

The picrate salt, prepared in ethanol and recrystallized from ethanol-methanol, melted at 158–160 degrees. Admixture with the picrate salt obtained in Example 7B depressed the melting point to 148–159 degrees.

Example 12

2-PHENETHYL-5-(3,4,5-TRIMETHOXYBENZOYL)-6-METHOXYOCTAHYDROISOINDOLE

Essentially as described in Example 8 the base obtained in Example 11B was esterfied with 3,4,5-trimethoxybenzoyl chloride. The product recrystallized from acetone-ether, melting at 174 degrees. The melting point of a mixture with the hydrochloride salt obtained in Example 8 was markedly depressed to 135–143 degrees. The present evidence indicates that this product is 2-phenethyl-5α-(3,4,5-trimethoxybenzoxy)-6β-methoxy-cis-octahydroisoindole hydrochloride.

*Analysis.*—Calculated: C, 64.07; H, 7.17; Cl, 7.01. Found: C, 63.72; H, 7.20; Cl, 7.49.

Example 13

A. N-(1-NAPHTHYLETHYL)-4-HYDROXY-5-METHOXY-1,2-CYCLOHEXANEDICARBOXIMIDE

In a manner similar to that used for the preparation of the compound of Example 7A, 1-naphthylethylamine was reacted with the product of Preparation I to give a thick oil which did not crystallize. The present evidence indicates that this product is N-(1-naphthylethyl)-4β-hydroxy-5α-methoxy-cis-1,2-cyclohexanedicarboximide.

B. 2-(1-NAHPTHYLETHYL)-5-HYDROXY-6-METHOXY-OCTAHYDROISOINDOLE

By a procedure similar to that of Example 7B, reduction of the crude product of Example 13A yielded 64 percent of an oil which distilled over the range 175–210 degrees at 0.1 millimeter pressure. The present evidence indicates that this product is 2-(1-naphthylethyl)-5β-hydroxy-6α-methoxy-cis-octahydroisoindole.

*Analysis.*—Calculated: N (basic), 4.30. Found: N (basic), 4.29.

2-(1-naphthylethyl)-5β-hydroxy-6α-methoxy-cis-octahydroisoindole hydrochloride was obtained from isopropyl alcohol-ether as a hygroscopic solid, melting to a glass at 55–60 degrees.

*Analysis.*—Calculated: C, 69.70; H, 7.80; Cl, 9.80. Found: C, 69.12; H, 7.51; Cl, 9.73.

Example 14

2-(1-NAPHTHYLETHYL)-5-(3,4,5-TRIMETHOXYBENZOXY)-6-METHOXYOCTAHYDROISOINDOLE

Essentially as described for the preparation of the product of Example 8, the base obtained in Example 13B was esterified with 3,4,5-trimethoxybenzoyl chloride. A 60 percent yield of material, melting with decomposition at 229–231 degrees, was obtained on recrystallization of the crude product from ethanol. The present evidence indicates that this product is 2-(1-naphthylethyl)-5β-(3,4,5-trimethoxybenzoxy)-6α-methoxy-cis-octahydroisoindole.

*Analysis.*—Calculated: C, 66.94; H, 6.88; Cl, 6.37. Found: C, 66.54; H, 6.79; Cl, 6.36.

Example 15

2-(1-NAPHTHYLETHYL)-5-PROPIONOXY-6-METHOXY-OCTAHYDROISOINDOLE

In a manner similar to that described in Example 3, the base obtained in Example 13B was treated with propionyl chloride to give a crystalline solid, melting at 138–145 degrees, after recrystallization from isopropyl alcohol-ether. The present evidence indicates that the product is 2 - (1-naphthylethyl)-5β-propionoxy-6α-methoxy-cis-octahydroisoindole hydrochloride.

*Analysis.*—Calculated: C, 69.00; H, 7.72; Cl, 8.47. Found: C, 69.10; H, 7.66; Cl, 8.46.

Example 16

A. 2-(4-METHOXYBENZYL)1,2,3,4,7,8,9-HEXAHYDROISOINDOLE

An isopropyl alcohol solution of 1 equivalent of 4-methoxybenzylamine and 1 equivalent of 4-cyclohexene-1,2-dimethanol bis-(toluenesulfonate) is refluxed on the steam-bath for several hours. The reaction solution is worked up to yield a low melting solid. The present evidence indicates that this product is 2-(4-methoxybenzyl)-cis-1,2,3,4,7,8,9-hexahydroisoindole.

B. 2-(4-METHOXYBENZYL)-5,6-EPOXYOCTAHYDROISOINDOLE

A chloroform solution of the product described in Example 16A is treated, in the cold, with a chloroform solution containing one equivalent of perbenzoic acid, essentially as described in Example 10B and a solid product is obtained. The present evidence indicates that this product is 2-(4-methoxybenzyl)-5,6β-epoxy-cis-octahydroisoindole.

C. 2-(4-METHOXYBENZYL)-5-HYDROXY-6-PROPOXY-OCTAHYDROISOINDOLE

The product obtained in Example 16B is dissolved in excess propyl alcohol, a few drops of concentrated sulfuric acid is added, and the solution is heated on a steam-bath for several hours. A low melting solid is obtained. The present evidence indicates that this product is 2-(4-methoxybenzyl) - 5β - hydroxy-6α-propoxy-cis-octahydroisoindole.

Example 17

A. N-(3-THIANAPHTHYLETHYL)-4-HYDROXY-5-METHOXY-1,2-CYCLOHEXANEDICARBOXIMIDE

Essentially as described in Example 1A, 3-thianaphthene ethylamine, Herz, J. Am. Chem. Soc., 72, 4999 (1950), is reacted with the product obtained in Preparation I to yield N-(3-thianaphthylethyl)-4-hydroxy-5-methoxy-1,2-cyclohexanedicarboximide.

B. 2-(3-THIANAPHTHYLETHYL)-5-HYDROXY-6-METHOXYOCTAHYDROISOINDOLE

Essentially as described in Example 1B, the product obtained in Example 1A is reduced with lithium aluminum hydride to yield 2-(3-thianaphthylethyl)-5-hydroxy-6-methoxyoctahydroisoindole.

Example 18

2-(3-THIANAPHTHYLETHYL)-5-(3,4,5-TRIMETHOXY-BENZOXY)-6-METHOXYOCTAHYDROISOINDOLE

Essentially as described in Example 2, the product obtained in Example 17B is treated with 3,4,5-trimethoxybenzoylchloride to give 2-(3-thianaphthylethyl)-5-(3,4,5-trimethoxybenzoxy)-6-methoxyoctahydroisoindole.

Example 19

A. 2-(α-METHYLBENZOFURFURYL)-1,2,3,4,7,8,9-HEXAHYDROISOINDOLE

Essentially as described in Example 16A, α-methyl-2-benzofuranmethylamine, Polonovski, Pesson and Kornowski, Compt. rend., 240, 319 (1955) and abstracted in Chem. Abstracts 50, 1748 (1956), is reacted with 4-cyclohexene-1,2-dimethanol bis-(toluenesulfonate) to give 2-(α - methylbenzofurfuryl) - 1,2,3,4,7,8,9 - hexahydroisoindole.

B. 2-(α-METHYLBENZOFURFURYL)-5,6-EPOXYOCTAHYDROISOINDOLE

An acetic acid solution of the product described in Example 19A is treated, in the cold, with one equivalent of peracetic acid in acetic acid. In this way there is obtained 2 - (α - methylbenzofurfuryl) - 5,6 - epoxyoctahydroisoindole.

C. 2-(α-METHYLBENZOFURFURYL)-5-HYDROXY-6-ETHOXYOCTAHYDROISOINDOLE

Essentially as described in Example 16C, the product obtained in Example 19B is reacted with ethyl alcohol to yield 2-(α-methylbenzofurfuryl)-5-hydroxy-6-ethoxyoctahydroisoindole.

Example 20

2-(α-METHYLBENZOFURFURYL)-5-(3,4,5-TRIMETHOXY-BENZOXY)-6-ETHOXYOCTAHYDROISOINDOLE

Essentially as described in Example 8, the product obtained in Example 19C is treated with 3,4,5-trimethoxybenzoyl chloride to give 2-(α-methylbenzofurfuryl)-5-(3, 4,5-trimethoxybenzoyl)-6-ethoxyoctahydroisoindole.

Example 21

A. N-(3-PHENYLPROPYL)-4-HYDROXY-5-METHOXY-1,2-CYCLOHEXANEDICARBOXIMIDE

Essentially as described in Example 7A, 3-phenylpropylamine is reacted with the product of Preparation I to yield a product which is indicated to be N-(3-phenylpropyl)-4β-hydroxy - 5α - methoxy-cis-1,2-cyclohexanedicarboximide.

B. 2-(3-PHENYLPROPYL)-5-HYDROXY-6-METHOXY-OCTAHYDROISOINDOLE

Essentially as described in Example 7B, the product of Example 21A is reduced with lithium aluminum hydride to yield a product which is indicated to be 2-(3-phenylpropyl)-5β-hydroxy - 6α - methoxy-cis-octahydroisoindole.

Example 22

A. N-(p-CHLOROPHENETHYL)-4-HYDROXY-5-METHOXY-1,2-CYCLOHEXANEDICARBOXIMIDE

Essentially as described in Example 7A, p-chlorophenethylamine is reacted with the product of Preparation I to yield a viscous oil. Present evidence indicates that this is N-(p-chlorophenethyl) - 4β - hydroxy - 5α - methoxy-cis-1,2-cyclohexanedicarboximide.

B. 2-(p-CHLOROPHENETHYL)-3-ETHYL-5-HYDROXY-6-METHOXY-Δ$^3$-HEXAHYDRO-1-ISOINDOLONE

To the Grignard reagent prepared from two equivalents of ethyl bromide and two equivalents of magnesium in anhydrous ether, is added, as rapidly as possible with stirring, an ether solution of one equivalent of the product obtained in Example 22A. The reaction mixture is stirred for eight hours at room temperature and treated cautiously with water and ammonium chloride. The ether layer is separated, dried and evaporated and the residual oil is distilled under high vacuum to give 2-(p-chlorophenethyl) - 3 - ethyl - 5 - hydroxy-6-methoxy-Δ$^3$-hexahydro-1-isoindolone as a low melting solid.

C. 2-(p-CHLOROPHENETHYL)-3-ETHYL-5-HYDROXY-6-METHOXYOCTAHYDROISOINDOLE

Essentially as described in Example 7B, the product of Example 22B is treated with lithium aluminum hydride to give 2-(p-chlorophenethyl) - 3 - ethyl - 5 - hydroxy-6-methoxyoctahydroisoindole as a low melting solid.

Example 23

A. 2-CARBOMETHOXY-4-METHOXY - 5 - HYDROXY-3,6-DIMETHYLCYCLOHEXANECARBOXYLIC ACID γ - LACTONE

Using essentially the method of Preparation I, 3,6-dimethyl - 4,5 - epoxy-hexahydrophthalic anhydride is converted to 2β-carbomethoxy - 4 - methoxy - 5 - hydroxy-3,6-dimethyl-cyclohexanecarboxylic acid γ-lactone.

B. N-(3,4-METHYLENEDIOXYPHENETHYL)-4-HYDROXY-5-METHOXY-3,6-DIMETHYL - 1,2 - CYCLOHEXANEDI-CARBOXIMIDE

Using the method of Example 7A, 3,4-methylenedioxyphenethylamine is reacted with the product of Example 23A to yield a viscous oil. Present evidence indicates that this is N-(3,4-methylenedioxyphenethyl) - 4 - hydroxy-5 - methoxy - 3,6 - dimethyl - 1,2-cyclohexanedicarboximide.

C. 2-(3,4-METHYLENEDIOXYPHENETHYL)-5-HYDROXY-6-METHOXY-4,7-DIMETHYLOCTAHYDROISOINDOLE

Essentially as described in Example 7B, the product of Example 23B is treated with lithium aluminum hydride to give a low melting solid product. Present evidence indicates that this is 2-(3,4-methylenedioxyphenethyl)-5-hydroxy - 6 - methoxy-4,7-dimethyloctahydroisoindole.

*Example 24*

A. d-N-(α-METHYLPHENETHYL)-4-CYCLOHEXENE-1,2-DICARBOXIMIDE

Using essentially the method of Example 10A, cis-Δ⁴-tetrahydrophthalic anhydride is reacted with d-α-methylphenethylamine to yield a solid product, melting at 69–70 degrees, $[\alpha]_D^{25}=67.0\pm2.0$ degrees (c.=1 in chloroform). The present evidence indicates that this product is d-N-(α-methylphenethyl) - 4 - cyclohexene-cis-1,2-dicarboximide.

*Analysis.*—Calculated: C, 75.80; H, 7.11. Found: C, 75.82; H, 7.13.

B. EPOXIDATION OF d-N-(α-METHYLPHENETHYL)-4-CYCLOHEXENE-1,2-DICARBOXIMIDE

Using essentially the method of Example 10B, the product of Example 24A is reacted with perbenzoic acid to yield a solid product melting at 169–170 degrees, $[\alpha]_D^{25}=80.0\pm2.0$ degrees (c.=1 in chloroform). The present evidence indicates that this product is d-N-(α-methylphenethyl) - 4,5β - epoxy-cis-1,2-cyclohexanedicarboximide.

An oily residue was also obtained which present evidence indicates is N-(α-methylphenethyl) - 4,5α - epoxy-cis-cyclohexane-1,2-dicarboximide.

C. N-(α-METHYLPHENETHYL)-4-HYDROXY-5-METHOXY-1,2-CYCLOHEXANEDICARBOXIMIDE

Methanolysis of the solid product of Example 24B, using essentially the method of Example 10C, yielded an oil. The present evidence indicates that this product is N-(α-methylphenethyl) - 4β - hydroxy - 5α - methoxy-cis-1,2-cyclohexanedicarboximide.

D. 2-(α-METHYLPHENETHYL)-5-HYDROXY-6-METHOXYOCTAHYDROISOINDOLE

Essentially as described in Example 7B, the crude product obtained in Example 24C was reduced with lithium aluminum hydride to yield an oil boiling between 171 and 177 degrees at 0.4 millimeters pressure. The present evidence indicates that this product is 2-(α-methylphenethyl)-5β-hydroxy - 6α - methoxy-cis-octahydroisoindole.

*Analysis.*—Calculated: N (basic), 4.84. Found: N (basic), 4.80.

2-(α-methylphenethyl) - 5β - hydroxy - 6α - methoxy-octahydroisoindole hydrochloride, prepared by treatment of an ether solution of the base with excess ethereal hydrogen chloride and recrystallized from isopropyl alcohol-ethyl acetate, was hygroscopic and melted at 96–98 degrees.

*Analysis.*—Calculated: C, 66.33; H, 8.66; Cl, 10.88. Found: C, 66.92; H, 8.41; Cl, 10.91.

*Example 25*

A. N-(α-METHYLPHENETHYL)-4-HYDROXY-5-METHOXY-1,2-CYCLOHEXANEDICARBOXIMIDE

Methanolysis of the oil, presumably the α-epoxide product of Example 24B, essentially as described in Example 10B afforded a yellow oil which failed to crystallize. The present evidence indicates that this product is N - (α - methylphenethyl) - 4α - hydroxy - 5β - methoxy-cis-1,2-cyclohexanedicarboximide.

B. 2-(α-METHYLPHENETHYL)-5-HYDROXY-6-METHOXYOCTAHYDROISOINDOLE

The crude product obtained in Example 25A was reduced with lithium aluminum hydride essentially as described in Example 7B to yield a liquid boiling between 163 and 175 degrees at 0.4 mm. pressure. Present evidence indicates this product to be 2-(α-methylphenethyl)-5α-hydroxy-6β-methoxy-cis-octahydroisoindole.

*Analysis.*—Calculated: N (basic), 4.84. Found: N (basic), 4.74.

2 - (α - methylphenethyl) - 5α - hydroxy - 6β - methoxy-cis-octahydroisoindole hydrochloride, prepared by treatment of an ether solution of the base with ethereal hydrogen chloride, was a hygroscopic low melting solid.

*Analysis.*—Calculated: C, 66.33; H, 8.66; Cl, 10.88. Found: C, 66.07; H, 8.88; Cl, 10.69.

The invention can be embodied in other specific forms without departing from the spirit or essential characteristics thereof. The foregoing physical embodiments are, therefore, to be considered in all respects illustrative and not restrictive, the scope of the invention being indicated by the appended claims rather than by the foregoing description, and all changes which come within the meaning and range of equivalents of the claims are therefore intended to be embodied therein.

I claim:

1. 2 - aralkyl - 5 - hydroxy - 6 - lower - alkoxy - octahydroisoindole, wherein aralkyl represents an aromatic ring system attached to an alkylene bridge of not more than three carbon atoms, said aromatic ring system having a total of from 5 to 10 coplanar ring atoms no more than one of which is a heteroatom, which heteroatom is selected from the group consisting of nitrogen, oxygen and sulphur atoms.

2. Ester derivative of 2-aralkyl-5-hydroxy-6-lower-alkoxy-octahydroisoindole, wherein aralkyl represents an aromatic ring system attached to an alkylene bridge of not more than three carbon atoms, said aromatic ring system having a total of from 5 to 10 coplanar ring atoms no more than one of which is a heteroatom, which heteroatom is selected from the group consisting of nitrogen, oxygen and sulphur atoms; and, wherein the acid from which the ester is derived is an organic monobasic carboxylic acid selected from the group consisting of lower-aliphtatic, monocyclo-lower - aliphatic, monocyclicaryl, and, monocyclicaryl-lower-aliphatic acids.

3. 2 - carbocyclic - aralkyl - 5 - (3,4,5 - trimethoxybenzoxy)-6-lower-alkoxy-octahydroisoindole wherein carbocyclic-aralkyl represents an aromatic ring system attached to an alkylene bridge of not more than three carbon atoms, said aromatic ring system having a total of from 5 to 10 coplanar ring carbon atoms.

4. 2 - indolylalkyl - 5 - (3,4,5 - trimethoxybenzoxy)-6-lower-alkoxy-octahydroisoindole wherein alkyl is an alkylene bridge of not more than three carbon atoms.

5. 2 - carbocyclic - aralkyl - 5 - hydroxy - 6 - lower-alkoxy-octahydroisoindole wherein carbocyclic - aralkyl represents an aromatic ring system attached to an alkylene bridge of not more than three carbon atoms, said aromatic ring system having a total of from 5 to 10 coplanar ring carbon atoms.

6. 2 - indolylalkyl - 5 - hydroxy - 6 - lower - alkoxy-octahydroisoindole wherein alkyl is an alkylene bridge of not more than three carbon atoms.

7. 2 - (3 - indolylethyl) - 5 - hydroxy - 6 - methoxy-octahydroisoindole.

8. 2 - (3 - indolylethyl) - 5 - hydroxy - 6 - ethoxy-octahydroisoindole.

9. 2 - (1 - naphthylethyl) - 5 - (3,4,5 - trimethoxybenzoxy)-6-methoxyoctahydroisoindole.

10. 2 - (3 - indolylethyl) - 5 - (3,4,5 - trimethoxybenzoxy)-6-methoxyoctahydroisoindole.

11. 2 - (3 - indolylethyl) - 5 - propionoxy - 6 - methoxy-octahydroisoindole.

12. N - aralkyl - 4 - hydroxy - 5 - lower - alkoxy - 1,2-cyclohexanedicarboximide wherein aralkyl represents an aromatic ring system attached to an alkylene bridge of not more than three carbon atoms, said aromatic ring system having a total of from 5 to 10 coplanar ring atoms no more than one of which is a heteroatom, which heteroatom is selected from the group consisting of nitrogen, oxygen and sulphur atoms.

13. 2 - carbo - lower - alkoxy - 4 - lower - alkoxy - 5-hydroxy-cyclohexanecarboxylic acid γ-lactone.

14. 2 - carbomethoxy - 4 - methoxy - 5 - hydroxy-cyclohexanecarboxylic acid γ-lactone.

15. A process for preparing 2-aralkyl-5-hydroxy-6-lower-alkoxy-octahydroisoindole; wherein aralkyl represents an aromatic ring system attached to an alkylene bridge containing not more than three carbon atoms, said aromatic ring system having a total of from 5 to 10 coplanar ring atoms no more than one of which is a heteroatom, which heteroatom is selected from the group consisting of nitrogen, oxygen and sulphur atoms; which includes the following steps: epoxidizing a Δ⁴-tetrahydrophthalic anhydride with a per acid to produce a 4,5-epoxy-tetrahydrophthalic anhydride; subjecting the resultant epoxy compound to acid catalyzed alcoholysis with a lower-alkanol and distilling the product so obtained to produce an ester γ-lactone of the formula:

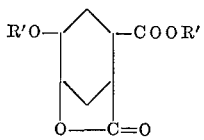

wherein R′ is lower-alkyl; reacting said ester γ-lactone with a primary aralkylamine to form an N-aralkyl-4-hydroxy - 5 - lower - alkoxy - 1,2 - cyclohexanedicarboximide wherein aralkyl is as defined above; and, reducing said imide with lithium aluminum hydride thereby to obtain the desired octahydroisoindole.

16. A process for preparing 2-carbo-lower-alkoxy-4-lower-alkoxy-5-hydroxy-cyclohexanecarboxylic acid γ-lactone which includes the steps of: subjecting Δ⁴-tetrahydrophthalic anhydride to per acid epoxidation with a per acid to produce 4,5-epoxy-tetrahydrophthalic anhydride, subjecting the resulting product to acid catalyzed alcoholysis using a lower-alkanol and distilling, thereby forming the desired 2-carbo-lower-alkoxy-4-hydroxy-5-lower - alkoxy-cyclohexane-carboxylic acid-lactone.

17. A process for preparing 2-aralkyl-5-hydroxy-6-lower-alkoxy-octahydroisoindole wherein aralkyl represents an aromatic ring system attached to an alkylene bridge containing not more than three carbon atoms, said aromatic ring system having a total of from 5 to 10 coplanar ring atoms no more than one of which is a heteroatom, which heteroatom is selected from the group consisting of nitrogen, oxygen and sulphur atoms, which includes the following steps: reacting a primary aralkyl-amine wherein aralkyl has the definition given above with a Δ⁴-tetrahydrophthalic anhydride at a temperature of 125–250 degrees centigrade to give an N-aralkyl-4-cyclohexenedicarboximide; reacting said imide with a per acid to form an N-aralkyl-4,5-epoxy-cyclohexane-1,2-dicarboximide; acid catalyzed alcoholysis of said epoxy-imide with a lower-alkanol to give an N-aralkyl-4-hydroxy-5-lower-alkoxy-1,2-cyclohexanedicarboximide; and reducing said imide with lithium aluminum hydride thereby obtaining the desired octahydroisoindole.

References Cited in the file of this patent
FOREIGN PATENTS
744,543     Great Britain _____ Feb. 8, 1956
OTHER REFERENCES
Bergmann: The Chemistry of Acetylene and Related Compounds, page 80 (1948).

UNITED STATES PATENT OFFICE
CERTIFICATE OF CORRECTION

Patent No. 3,127,413　　　　　　　　　　　　　　March 31, 1964

Allan Poe Gray

It is hereby certified that error appears in the above numbered patent requiring correction and that the said Letters Patent should read as corrected below.

Column 4, line 2, for "designed" read -- designated --; column 9, line 59, for "dis" read -- cis --; column 10, line 6, and column 12, line 14, for "TRIMETHOXYBENZOYL)", each occurrence, read -- $_2$TRIMETHOXYBENZOXY) --; column 11, line 69, for "$n_D$" read -- $n_D^{25}$ --; column 12, line 16, for "esterfied" read -- esterified --; column 14, line 14, for "trimethoxybenzoyl)" read -- trimethoxybenzoxy) --.

Signed and sealed this 28th day of July 1964.

(SEAL)

Attest:

ESTON G. JOHNSON　　　　　　　　　　　　　　EDWARD J. BRENNER
Attesting Officer　　　　　　　　　　　　　　　Commissioner of Patents